Figure 1:
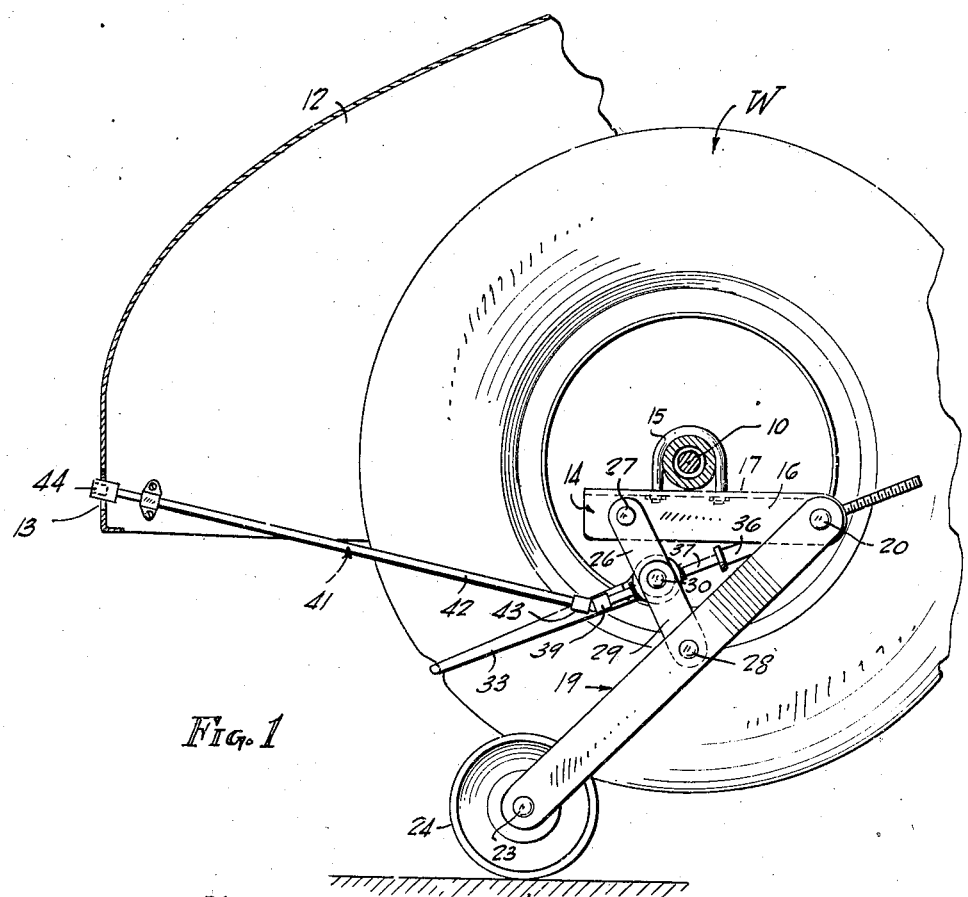

April 16, 1940.  H. A. WHARTENBY ET AL  2,197,026
JACK
Filed Feb. 27, 1939

INVENTOR.
Harry Allen Whartenby &
Lewis Rementer
BY
ATTORNEY.

Patented Apr. 16, 1940

2,197,026

UNITED STATES PATENT OFFICE 2,197,026

JACK

Harry Allen Whartenby and Lewis Rementer, Philadelphia, Pa.

Application February 27, 1939, Serial No. 258,630

6 Claims. (Cl. 254—86)

This invention has to do with jacks such as are employed for the purpose of raising motor vehicles off the ground on occasions such as deflation of tires or other conditions requiring the raising of the wheel or wheels of the vehicle off the ground.

It is now conventional practice for the driver of an automobile to maintain one of the well-known types of jacks now available in his tool kit, and when a tire becomes flat place the jack beneath the axle, or other part of the vehicle adjacent the tire, and raise the same from the ground so that a spare may be substituted or the tire repaired. Many times a flat or other damage occurs under conditions in which such use of the jack is highly inconvenient, but prior to the advent of this invention there has been no substitute for using the jack other than driving on the flat, and if the damage to the car is of such a nature as to prevent riding on a damaged wheel there is nothing to do but use the jack at the inconvenient location.

The inconvenience of using the jack is substantially entirely attributable to the need for accurately positioning the same beneath a proper part of the vehicle. Generally speaking the rear axle, or other appropriate points, are inaccessible, and it is highly annoying to properly position the jack therebeneath.

Bearing the foregoing conditions in mind this invention has in view, as its foremost objective, the provision of a jack which is designed to be permanently secured to the chassis of a motor vehicle at an appropriate point, and which jack is readily operable when its use is required to raise that particular part of the vehicle from the ground.

The invention contemplates an arrangement wherein each motor vehicle will be equipped with at least two of the jacks, one being located at each side of the car adjacent to or beneath the rear axle, as it is the rear part of the car which is generally more inaccessible to having the jack placed therebeneath.

The invention has in view, as a further objective, the provision of a jack of the character above described which includes as a ground or road engaging part a wheel or roller element. Thus when a jack is operated to raise the particular part of the vehicle with which it is associated from the road, the wheel of the jack is rendered effective to support the vehicle, and it is then possible to drive the car on the jack wheel to a service station or other place where the necessary repairs may be conveniently carried out.

In providing a jack of the character above noted it becomes important that the operating parts of the jack be of such a nature that they may be readily operated from a convenient position.

Another important object, therefore, is the provision of a jack of the character above noted to which an operating member may be readily and detachably secured when occasion demands. With a pair of jacks anchored to a car in positions to accommodate both of the rear wheels when occasion demands it becomes necessary to provide for holding a rear wheel immovable after it has been lifted from the ground, otherwise the differential in the rear axle would cause the raised wheel to spin freely, and prevent any drive going to the other rear wheel.

Accordingly the invention has in view, as a further important object, the provision of a jack of the character above described which includes means for holding a wheel raised off the ground against rotation.

A somewhat more specific object of the invention lies in the provision of a jack including means for holding the wheel, and which means is automatically brought into effect as the wheel is raised from the road.

Various other more detailed objects and advantages of the invention will in part become apparent, and in part be hereinafter stated, as the description of the invention proceeds.

The invention, therefore, comprises a jack including means for permanently securing the same to the chassis of a motor vehicle adjacent to or beneath a rear axle, a wheel adapted to engage the ground to support the vehicle in a raised position, operating mechanism including a connection for detachably securing an operating member thereto, and means for holding a rear wheel of the vehicle against rotation when in an upraised position.

This application is a continuation in part of the copending application of Harry A. Whartenby et al., Serial No. 221,179, filed July 25, 1938, for "Automobile jack, a lifting and rolling device."

Figure 2:
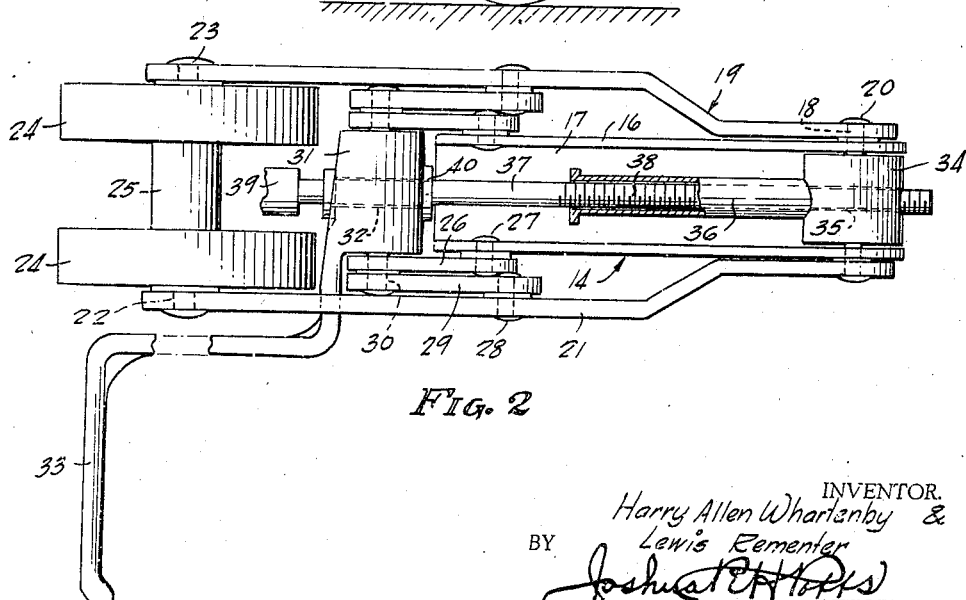

For a full and more complete understanding of the invention reference may be had to the following description and accompanying drawing, wherein Figure 1 is a side view, partly in elevation and partly in section, showing a jack as mounted on a motor vehicle at the rear in accordance with the precepts of this invention, and Figure 2 is a bottom view of the jack mechanism per se in a collapsed state.

Referring now to the drawing, wherein like reference characters denote corresponding parts, a rear wheel of a motor vehicle is designated W and is shown as mounted on the usual rear axle 10, the housing of which also houses the differential in a well known manner.

The wheel W is covered by a fender 12 in the usual manner, and this fender is formed with an opening at 13 for a purpose to be later described.

The jack mechanism comprises a top anchoring bar 14 which is securely affixed to the housing of the rear axle 10 on the under side thereof in any preferred manner. It may be secured to the rear axle housing by a mechanical anchoring device such as shown at 15. Any securing means which will give the positive connection required will suffice. The top bar 14 preferably takes the form of a channel member opening towards the bottom and providing side flanges 16 that are connected together by the top 17, this top 17 being comparatively wide to adequately accommodate the various parts which are operably secured thereto. At the forward end, the side flanges 16 carry pivot pins 18 which extend beyond the flanges on each side. Pivotally secured to the extensions of the pins 18 are side arms 19 that may be held assembled on the pins 18 by the enlarged or riveted heads 20.

Each of the arms 19 is offset as shown at 21 to provide a wider spacing of these bars away from the pivotal mounting at 18. Extending between the offset portions 21 at their free extremities is a pivot member 22, the extremities of which are headed at 23 to maintain the same assembled on the parts 21. A pair of jack wheels 24 which may be made from any suitable material, such as rubber or appropriate composition, are carried by the pivot member 22 between the offset parts 21 of the arms 19 and are preferably maintained in spaced relationship by the spacing member shown at 25, which is carried by the pivot 22.

Pivotally secured to each of the flanges 16 of the top bar 14 on the exterior side thereof is a toggle link 26, the pivotal connection of which is shown at 27 and which preferably takes the form of a pin having its heads spread as by riveting to maintain the assembly. Pivotally connected in a similar manner on the inner side of each of the offset parts 21 of the arms 19 as shown at 28 is another toggle link 29. The ends of the toggle links 26 and 29 are formed with openings through which pass the pins 30 which serve to complete the toggle. Thus the links 26 are pivotally mounted at one end on the pins 27 and at the other on the pins 30, while the links 29 are pivotally mounted at one end on the pins 28 and at the other on the pins 30. Thus, there is a toggle mechanism provided at each side of the jack.

The pins 30 project inwardly from the links 26 and carry between the links 26, as an integral part thereof, a swivel member 31. This swivel member 31 carries a bore 32 that transverses the axes of the pins 30, the latter being maintained in alignment by the swivel 31. The swivel 31 also carries an arm 33 which extends outwardly from one side and has dual functions as will be later pointed out.

The pins 18 extend inwardly of the flanges 16 and the inwardly projecting parts carry, as an integral part thereof, a second swivel member 34 that is formed with a bore 35 that is intended to be aligned with the bore 32. This bore 35 is threaded. Extending outwardly from the member 34 and beneath the top part 17 is a lubricant retainer in the form of a tubular member 36. A screw stem 37 is threaded as shown at 38 and this threaded end is received in the threaded bore 35. This screw stem 37 extends through the tubular member 36 and the bore 32 from which it projects and the free end is formed with a coupling 39 designed to operatively connect the same with a flexible driving shaft as will be later pointed out. At each end of the bore 32 the stem 37 is formed with a flange 40; thus, as the stem 37 is rotated, the screw threads at 35 and 38 cause the same to move longitudinally, and this longitudinal movement is imparted to the swivel member 31 due to the flanges 40.

Referring now more particularly to Figure 1, the flexible driving shaft is referred to in its entirety by the reference character 41 and is shown as comprising a plurality of links 42 connected by the flexible couplings 43. At one end the flexible driving shaft 41 is connected to the coupling 39 and at the other carries one part of a detachable coupling which is positioned in the opening 13, this part being shown at 44.

In the condition of the mechanism illustrated in Figure 1, the jack wheels 24 are shown as supporting the wheel W in an upraised position off the road bed. In this position, the arm 33 engages the wheel W to prevent rotation thereof. Thus, when power is transmitted to the differential in the rear axle 10, the wheel W will not spin freely and power will be transmitted to the wheel at the other side of the car. Thus, the car may be driven to a location where the tire may be changed or other repairs carried out. When it is desired to render the jack member ineffective and have the car supported by the wheel W rather than the jack wheels, an appropriate wrench is applied to the detachable connection at 44. As the wrench is turned, rotative power is transmitted through the flexible driving shaft 41 to the screw stem 37. The engagement of the threads at 38 with the threads of the bore 35 causes the stem 37 to move to the left, speaking with reference to the drawing, whereupon the pins 30 of the toggles are moved in a corresponding direction to collapse the arms 19 with respect to the flanges 16 of the top part 17. Thus, the jack wheels 24 are retracted and raised from the road bed.

As the jack mechanism is intended to be permanently secured to the chassis of the vehicle and at all times available for use, it is important that the pins 30 never attain a position of "dead center" in which it would be impossible to operate the jack. The fact that the arm 33 extends above the offset part 21 of the arm 19 at one side causes the arm 33 to function as a stop that prevents the attainment of any "dead center."

It is important to note that as the pivot pins 30 are moved rearwardly to collapse the jack, the pins 30 carry with them the swivel member 31. Thus, the arm 33 is also moved out of engagement with the wheel W to release the latter.

When occasion arises that it becomes necessary to jack the wheel W off the ground, the wrench is applied at the connection 44 in the manner above described and rotated in the opposite direction from that in which it is turned for the above described operation. The pins 30 are thus moved inwardly, and through the links 26 and 29 the arms 19 are swung downwardly to cause the wheel 24 to engage the road bed and raise the wheel W.

It is to be clearly understood that the jack of this invention may be permanently secured to any part of the chassis or vehicle which may suit the construction of the particular car. By employing a flexible driving shaft as shown at 41, the operating connection at which the wrench is applied may always be conveniently located.

While a preferred specific embodiment of the invention is hereinbefore set forth it is to be clearly understood that the invention is not to be limited to the exact constructions illustrated and described, because various modifications of these details may be provided in putting the invention into practice within the purview of the appended claims.

We claim:

1. A jack for motor vehicles comprising a bar, means for rigidly affixing said bar to the framework of a motor vehicle adjacent to a rear wheel, an arm pivotally carried by said bar, a wheel on the free end of said arm, a toggle link assembly between said bar and arm, means for operating said toggle link to move the arm with respect to the bar, means included as a part of said last mentioned means for engaging the wheel of the motor vehicle as the arm is expanded with respect to the bar to cause the wheel to engage the ground.

2. In combination, a motor vehicle including a framework and a rear wheel, and a jack permanently secured to said framework and having means adapted to engage said rear wheel co-incident with operation of the jack.

3. In combination, a motor vehicle including a framework and a rear wheel, a jack comprising a bar fixedly secured to said framework adjacent to said wheel, an arm pivotally carried by the bar, a toggle link assembly between said arm and bar and including a movable pivot point, means for moving said pivot point to expand or collapse the said arm with respect to the bar, and means for preventing said toggle link assembly from assuming a "dead center" position.

4. In combination, a motor vehicle including a framework and a rear wheel, a jack comprising a bar fixedly secured to said framework adjacent to said wheel, an arm pivotally carried by the bar, a toggle link assembly between said arm and bar and including a movable pivot point, means for moving said pivot point to expand or collapse the said arm with respect to the bar, and a cross piece carried by said movable pivot point for engaging the wheel of the motor vehicle as an incident to expansion of the arm with respect to the bar, said cross piece also preventing the pivot point from assuming a "dead center" position upon collapse of the cross piece.

5. A jack for motor vehicles comprising a channel bar having spaced flanges, means for securing said bar to the framework of a motor vehicle, a pair of arms spaced apart, each of said arms being pivoted to one of said side flanges, a pair of wheels carried at the free end of said arms, a toggle link assembly connecting each of the flanges with the arm that is pivotaly mounted thereon, said toggle link assembly including movable pivot points, and mechanism associated with said last said means for moving said pivot points to expand or collapse the arms with respect to the bar.

6. In combination, a motor vehicle including a framework, a rear wheel and a fender covering the said wheel, a jack fixedly secured to said framework adjacent to the rear wheel, said jack including a pivotally mounted arm carrying a wheel at its free end adapted to engage the road bed on which the motor vehicle is standing, mechanism for causing pivotal movement of said arm, said mechanism including a screw stem, driving connections between said screw stems and an accessible point on the said fender, and means included as a part of the operating mechanism of the said arm for engaging the said wheel of the motor vehicle as an incident to engagement of the jack wheel with the road bed.

HARRY ALLEN WHARTENBY.
LEWIS REMENTER.